United States Patent [19]

Suzuki

[11] 4,093,288
[45] June 6, 1978

[54] BINDING STRAP MADE OF SYNTHETIC RESIN

[75] Inventor: Tadashi Suzuki, Saitama, Japan

[73] Assignee: Toska Co., Ltd., Tokyo, Japan

[21] Appl. No.: 755,171

[22] Filed: Dec. 29, 1976

[30] Foreign Application Priority Data

Jan. 14, 1976  Japan ................................. 51-3049

[51] Int. Cl.$^2$ ........................................... B65D 55/06
[52] U.S. Cl. .................................. 292/321; 24/16 PB
[58] Field of Search ............ 24/16 PB, 30.5 P, 206 A, 24/206 R, 208 A, 73 PB, 150 FP, 17 A, 17 B; 292/321

[56] References Cited

U.S. PATENT DOCUMENTS

| 3,712,655 | 1/1973 | Fuehrer | 24/16 PB X |
| 3,816,879 | 6/1974 | Merser et al. | 24/16 PB |
| 4,001,898 | 1/1977 | Caveney | 24/16 PB |

Primary Examiner—Werner H. Schroeder
Attorney, Agent, or Firm—Armstrong, Nikaido, Marmelstein & Kubovcik

[57] ABSTRACT

A binding strap made of synthetic resin comprises a head portion, an intermediate portion extending from the side of the head portion and a connecting portion provided at the forward end of the intermediate portion. The head portion of this binding strap is formed with an insert hole having a stop tooth, so that when the connecting portion is inserted through said insert hole, the enlarged portion of the connecting portion engages with said stop tooth thereby effecting sure connection without slipping-off of the connecting portion therefrom. This intermediate portion may be provided with an indication portion for an appropriate indication, and therefore this binding strap can also have a function of indication other than binding.

8 Claims, 8 Drawing Figures

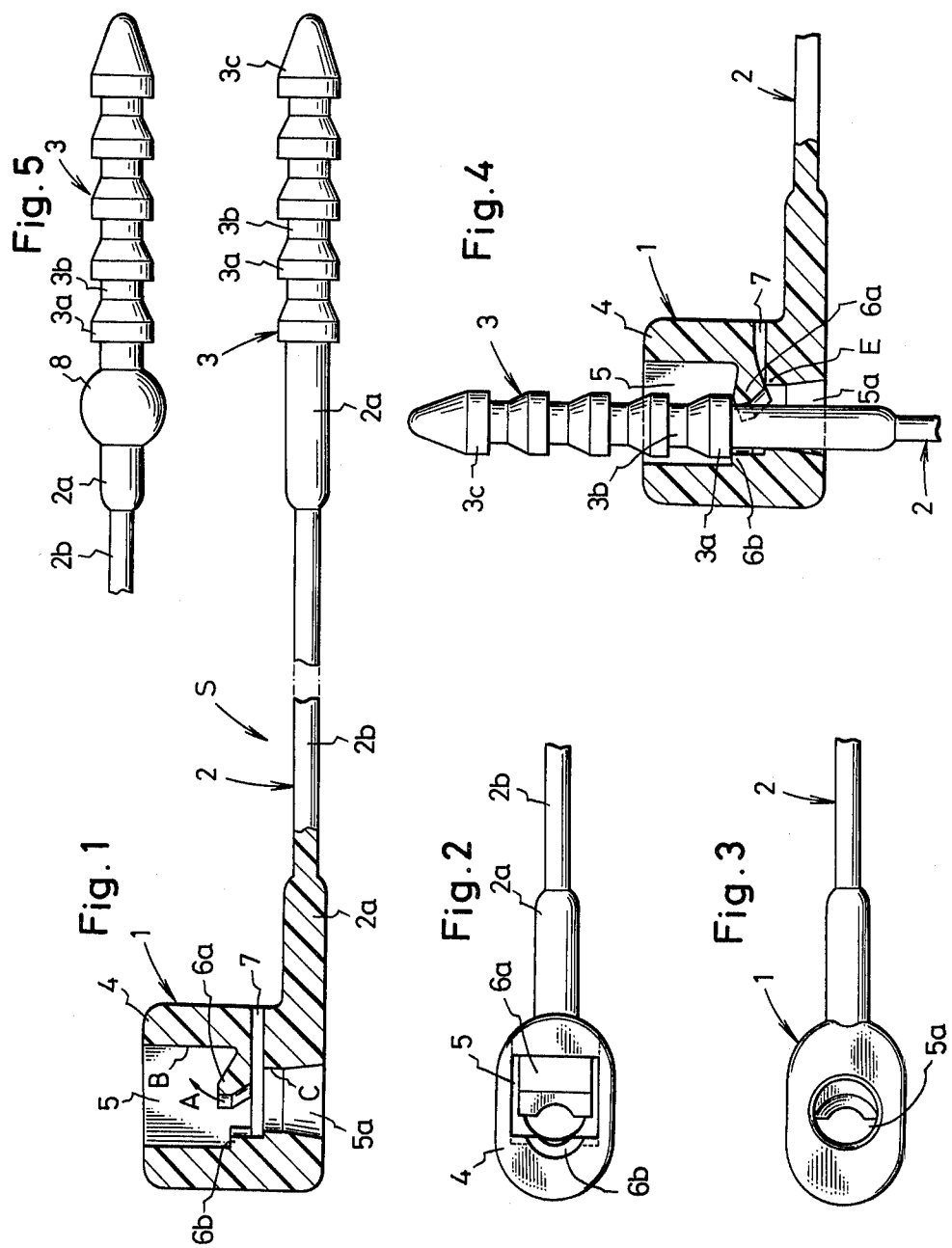

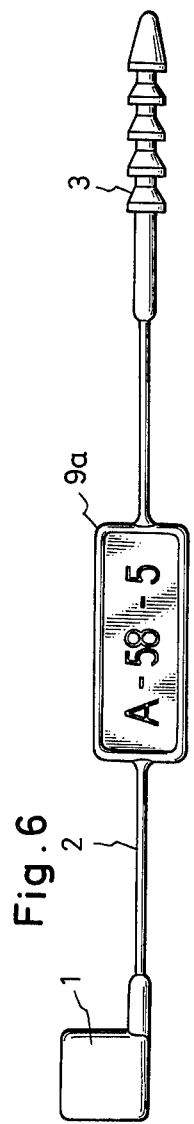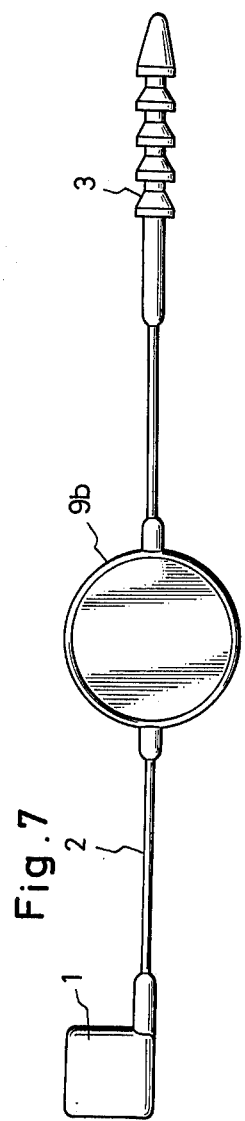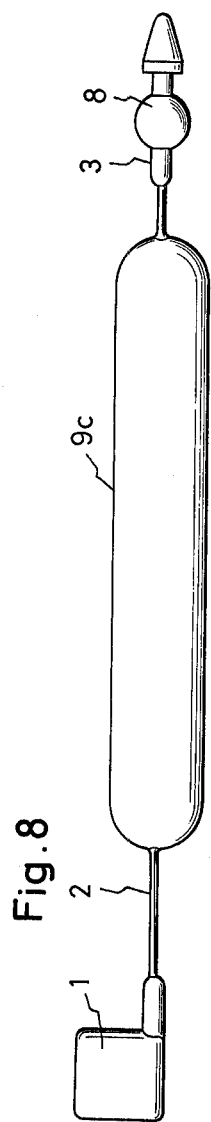

4,093,288

BINDING STRAP MADE OF SYNTHETIC RESIN

BACKGROUND OF THE INVENTION

The present invention relates to a binding strap and more particularly to a binding strap having strong connecting force and being easy in production thereof.

The binding strap made of synthetic resin has been used, for example, for connection of two or more kinds of objects, sealing or binding of the mouth of bag-like object, attachment of label to goods and so on, but the prior art binding strap is weak in its connecting force so that it is easy to disconnect after the binding, and also after the binding, a necessary indication can not be written on the binding strap easily.

The present invention provides a binding strap made of synthetic resin which can remove the above drawbacks of the prior art, and therefore an object of the present invention is to provide a binding strap made of synthetic resin which is strong in its connecting force and can perform sure binding with bare hands and with one touch action.

Another object of the present invention is to provide a binding strap which is produced by a synthetic resin material easily and at a lower cost.

A further object of the present invention is to provide a binding strap which serves as a binding means and also as an appropriate indication means.

SUMMARY OF THE INVENTION

The binding strap made of synthetic resin according to the present invention is characterized by comprising a head portion, an intermediate portion extending from said head portion and a connecting portion provided at the forward end of said intermediate portion, and being constructed such that said connecting portion is inserted through an insert hole formed in the head portion thereby engaging an enlarged portion of the connecting portion with a stop tooth protruding in said insert hole to effect sure stopping engagement therebetween without disconnection. The tooth for stopping engagement preferably comprises a fixed tooth part and a movable tooth part located opposite to said fixed tooth part and being elastic for rocking motion, and has a slit below said movable tooth to allow it to be rocked easily.

The binding strap of the present invention can be utilized broadly, for example, for the connecting of caps of various kinds of containers, the binding of the mouth of bags, the binding of optional two objects and so on, and if desired, it may be used for binding wires into a bundle. Also, the binding strap of the present invention can be used in such a manner that when an indication portion is provided at the intermediate portion, optional indications can be written thereon, such as dates of the binding of containers to be bound, kinds and qualities of contents in containers, names of owners and so on.

The foregoing and other objects, features and advantages of the present invention will become more apparent from the following detailed description.

BRIEF DESCRIPTION OF DRAWINGS

FIG. 1 is a partially sectional front view of a binding strap according to the present invention showing the interior construction of the head portion in section;

FIG. 2 is a plan view of the head portion of the binding strap;

FIG. 3 is a bottom view of the head portion;

FIG. 4 is a cross-sectional view showing the connecting condition of the head portion with the connecting portion;

FIG. 5 is a partial front view showing another embodiment of the connecting portion; and FIGS. 6 through 8 are front views showing various kinds of embodiments of the binding straps having indication portions respectively.

DETAILED DESCRIPTION OF THE PREFERRED EMBODIMENTS

Referring to the drawings, an embodiment shown in FIG. 1 comprises a head portion 1, an intermediate portion 2 and a connecting portion 3, and the whole is molded from a thermoplastic resin having a strength such as nylon.

The head portion 1 has an annular wall 4 and an insert hole 5 therethrough, and the bottom of the annular wall 4 has a movable tooth part 6a and a fixed tooth part 6b. This movable tooth part 6a protrudes from a part of the annular wall 4 and has a slit 7 at the bottom thereof so as to allow the movable tooth part 6a to be elastically rocked. A fixed tooth part 6b opposite to said movable tooth part 6a is formed by projecting a portion of the annular wall 4 and is adapted to support a force of pulling-out of the connecting portion. Below said insert hole 5 there is provided an insert hole part 5a of a smaller cross-sectional area than that of said insert hole, and the insert hole part 5a has a tapered shape expanding downwards and a dimension corresponding to the outside diameter of the connection portion 3. The wall face C of the insert hole part 5a is located at a position where it approaches to the forward end side of the movable tooth part 6a compared with the wall face B of the annular wall 4, and as described hereinafter, this portion supports the bottom face of the movable tooth part 6a.

The intermediate portion 2 is a portion for winding around an object, and is formed in a thin bristle-like shape (slightly thicker than fiber) in the case shown in FIG. 1. This intermediate portion 2 is stretched, after molded in the shape of bristle, to make thin the diameter and increase the strength thereof in order to give softness thereto. In the drawing, 2a is unstretched portion and 2b is stretched portion.

The connecting portion 3 has enlarged parts 3a and constricted parts 3b arranged alternately, and also has a tip part 3c which is tapered in the shape of cone, and the whole is approximately of saw-toothed shape in its cross section. When viewed in cross-section the alternating enlarged and constricted parts have a saw-toothed edge along both the left and right borders, thus having the appearance of a double saw-toothed edge.

In the use of said binding strap, according to an object of use, the intermediate portion 2 is wound around a necessary position to be bound or connected, or it is passed through a hole of an article and bent and then the tip part 3c of the connecting portion 3 is inserted through the insert hole part 5a. In this insertion operation, the tooth part 6a rocks as shown by an arrow A. On the contrary, when a force is applied to the intermediate portion 2 in the direction of an arrow D in FIG. 4, the movable tooth part 6a flexes thereby pushing the connecting portion 3 against the fixed tooth part 6b, and the lower face of the movable tooth part 6a abuts to the portion E of the wall face forming the slit 7 thereby preventing further movement thereof. Also, as is obvious from FIG. 4, in the condition of the engagement of the connecting portion 3 with the head portion 1, the movable tooth part 6a is in the condition where it is covered by the annular wall 4 and the enlarged portion 3a, so that it is almost impossible to pull out the connecting portion 3 in the arrow direction D.

FIG. 5 shows another connecting portion 3, in which a stopper 8 is provided on the intermediate portion 2 at a position near the enlarged part 3a which is located most near to the intermediate portion 2. In this embodiment, this stopper 8 is a sphere of a diameter larger than that of the enlarged part 3a so that it can not fit in the tapered insert hole part 5a. Once the connecting portion 3 is inserted through the insert hole 5 and said stopper 8 contacts with the inlet of the insert hole part 5a, the connecting portion 3 is into the condition where it can not move in either direction at all.

FIGS. 6 through 8 show other embodiments which are provided with indication portions 9a, 9b and 9c respectively, and the bristle-like parts on both sides of each indication portion are stretched to increase the strength thereof as desired.

The present invention is characterized by having a head portion and an intermediate portion of the special shape as described above and, if desired, providing an indication portion in the intermediate portion, and has the following effects:

(a) Since a movable tooth part 6a and a fixed tooth part 6b are formed below the insert hole 5 surrounded by the annular wall 4 of the head portion 1, once the connecting portion 3 is engaged with the head portion 1, the movable tooth part 6a is covered by the enlarged part 3a as shown in FIG. 4, so that disengagement thereof is quite impossible, thereby effecting sure binding operation.

(b) Since a slit 7 is formed below the movable tooth part 6a so as to support the lower face of the movable tooth part 6a by E part of a portion of the wall face forming the slit 7, there is such a condition as if the connecting portion 3 is supported by the lever of the movable tooth part 6a, so that the connecting portion 3 resists the pulling-out force tending to pull the head portion 1 out of the insert hole 5.

(c) If an indication portion 9a, 9b, 9c is formed in the intermediate portion 2, date of binding, name of manufacturer, kind of goods etc. can be written therein, so that it can be used, for example, for binding of meters and various kinds of containers etc. as well as for indication.

Although the present invention has been described with reference to preferred embodiments, it is to be understood that it is not to be limited to the above description since changes and modifications may be made therein which are within the full intended scope of the invention as hereinafter claimed.

What is claimed is:

1. A binding strap comprising:
   a head portion, said head portion including a centrally located passageway;
   an intermediate portion having a first end extending from a side of said head portion;
   a connecting portion formed at a second end of said intermediate portion remote from said first end;
   stop tooth means formed within said passageway, said stop tooth means comprising a centrally projecting fixed tooth part having an upper face and a centrally projecting elastically rockable tooth part having upper and lower faces positioned diametrically opposite to said fixed tooth part;
   a slit, said slit being positioned below said rockable tooth part for further assisting rocking motion of said rockable tooth part, said slit forming a supporting wall face which supports said lower face of said rockable tooth part when said rockable tooth part is in a first position for lockably restraining said connecting portion, while allowing free rocking motion when said lockable tooth part is in another position during insertion of said connecting portion, both said upper faces lying in the same plane only when said fixed tooth part and said rockable tooth part are lockably restraining said connecting portion.

2. A binding strap as claimed in claim 1, wherein said connecting portion has at least one pair of enlarged and constricted parts formed alternately and extending uniformly about the entire periphery of said connecting portion, said at least one pair of enlarged and constricted parts being of double saw-toothed shape in cross-section, and the flat face of the underside of said enlarged parts engages with flat upper faces of both said fixed and rockable tooth parts for preventing disengagement therebetween.

3. A binding strap as claimed in claim 1, wherein a stop means of a relatively larger diameter than said centrally located passageway is formed in said intermediate portion at a position adjacent to said enlarged part of said connecting portion so as to prevent further insertion of said connecting portion into said head portion, the joint action of said stop means, said enlarged part and said stop tooth means cooperating to prevent movement of said connecting portion in either the insertion or removal direction, thereby effecting sure stop engagement of the connecting portion.

4. A binding strap as claimed in claim 1, wherein said intermediate portion includes a unitary indication portion positioned mid-way along the length of said intermediate portion for providing an indication surface.

5. A binding strap as claimed in claim 1, wherein said centrally located passageway includes an entrance portion located below said stop tooth means and an exit portion located above said stop tooth means, said entrance portion having a relatively smaller cross-sectional area than said exit portion, said entrance portion having conical tapered walls for facilitating insertion of said connecting portion.

6. A binding strap as claimed in claim 1, wherein said fixed tooth part further includes a lower face, said lower faces lying in the same plane when said connecting portion is not inserted into said head portion centrally located aperture.

7. A binding strap as claimed in claim 1, wherein said binding strap is of a unitary construction and is formed from synthetic resin.

8. A binding strap as claimed in claim 2, wherein the length of said connecting portion is less than the length of said intermediate portion.

* * * * *

UNITED STATES PATENT AND TRADEMARK OFFICE
CERTIFICATE OF CORRECTION

PATENT NO. : 4,093,288
DATED : June 6, 1978
INVENTOR(S) : Tadashi SUZUKI

It is certified that error appears in the above-identified patent and that said Letters Patent are hereby corrected as shown below:

Page 1

Column 1, [73] change "Assignee:Toska Co., Ltd., Tokyo, Japan" to

--Assignees: Toska Co., Ltd., Tokyo; Sato Gosei Co., Ltd., Tokyo, both of Japan--.

Signed and Sealed this

Twentieth Day of March 1979

[SEAL]

Attest:

RUTH C. MASON
Attesting Officer

DONALD W. BANNER
Commissioner of Patents and Trademarks